United States Patent
Wu

(10) Patent No.: US 11,770,883 B1
(45) Date of Patent: Sep. 26, 2023

(54) ILLUMINATION MODULE WITH MULTI LIGHT SOURCES AND HEADLIGHT HAVING THE SAME

(71) Applicant: COPLUS INC., Tainan (TW)

(72) Inventor: Jacob Wu, Tainan (TW)

(73) Assignee: COPLUS INC., Tainan (TW)

( * ) Notice: Subject to any disclaimer, the term of this patent is extended or adjusted under 35 U.S.C. 154(b) by 0 days.

(21) Appl. No.: 17/943,686

(22) Filed: Sep. 13, 2022

Related U.S. Application Data

(60) Provisional application No. 63/397,711, filed on Aug. 12, 2022.

(51) Int. Cl.
*H05B 45/20* (2020.01)
*F21S 41/663* (2018.01)
*F21S 41/143* (2018.01)
*F21Y 115/10* (2016.01)

(52) U.S. Cl.
CPC ............ *H05B 45/20* (2020.01); *F21S 41/143* (2018.01); *F21S 41/663* (2018.01); *F21Y 2115/10* (2016.08)

(58) Field of Classification Search
CPC ....... F21S 41/337; F21S 41/334; F21S 41/336
See application file for complete search history.

(56) References Cited

U.S. PATENT DOCUMENTS 10,760,765 B2 * 9/2020 Trytko .................... F21S 43/37
11,175,008 B2 * 11/2021 Yatabe .................. F21S 41/337

* cited by examiner

*Primary Examiner* — Matthew J. Peerce
(74) *Attorney, Agent, or Firm* — Chun-Ming Shih; HDLS IPR SERVICES

(57) ABSTRACT

The present invention is an illumination module including at least one light path adjustment unit, at least one first light source, and at least one second light source. The first light source is configured to generate a first color light and project the first color light to the light path adjustment element. A second light source is configured to generate a second color light and project the second color light to the light path adjustment element. The light path adjustment element projects the first color light and the second color light to the front of the illumination module, and the first color light and the second color light partially or fully overlap.

13 Claims, 9 Drawing Sheets

US 11,770,883 B1

ILLUMINATION MODULE WITH MULTI LIGHT SOURCES AND HEADLIGHT HAVING THE SAME

REFERENCE TO RELATED APPLICATIONS

This non-provisional application claims priority under 35 U.S.C. § 119(a) on U.S. Provisional Application No. 63/397,711 filed Aug. 12, 2022, the entire contents of which are incorporated herein by reference.

BACKGROUND

Technical Field

This disclosure is related to vehicle parts, in particular to an illumination module with multi light sources and vehicle lamp having the illumination module.

Related Art

Compared with incandescent lamps, LEDs have the advantages of small size, high brightness, long service life and power saving. LEDs have been used in automotive headlamps to produce high brightness white light, which can achieve good lighting effects under normal conditions. However, the color temperature of the white light generated by LED automotive headlamps is relatively high and often does not achieve the desired lighting effect in bad weather conditions, such as rainy weather, snowy weather or foggy weather. The white light may also affect the driver's vision, which in turn affects the safety of driving Therefore, in bad weather, drivers often need to turn on the fog lights and illuminate with the white light from the LED vehicle lamp set to increase the safety of driving. However, the fog lights are installed in a low position and irradiated at a close distance, which usually only have the effect of warning and do not provide good lighting effect. In addition, fog lights are mostly stand-alone, not even standard equipment when the car is sold. Additional retrofitting also increases installation costs.

SUMMARY

In order to improve the shortcomings of the traditional LED headlamp in the art, this disclosure further proposes to set up a multiple color light sources in the vehicle lamp, which can generate different color lights at the same time and can significantly improve the problem of poor lighting effect of the LED headlamp in bad weather.

To achieve the object, this disclosure provides an illumination module with multi light sources, which comprises: at least one light path adjustment unit; at least one first light source configured to generate a first color light, and projecting the first color light to the light path adjustment unit; and at least one second light source configured to generate a second color light, and projecting the second color light to the light path adjustment unit. The light path adjustment unit is configured to project the first color light and the second color light to a front of the illumination module with multi light sources, such that the first color light and the second color light partially or fully overlap.

This disclosure further provides a vehicle lamp, which comprises the above-mentioned plurality of illumination modules integrated into a lamp housing.

In practical application, an ordinary headlamp can be directly replaced by the illumination module with multi light sources described in this disclosure, and the light control lever in the vehicle can be adjusted to enable the vehicle to emit a bad weather light source. In other words, the headlamp described in the present disclosure can be quickly and conveniently installed on an ordinary vehicle and improve the safety of the vehicle.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
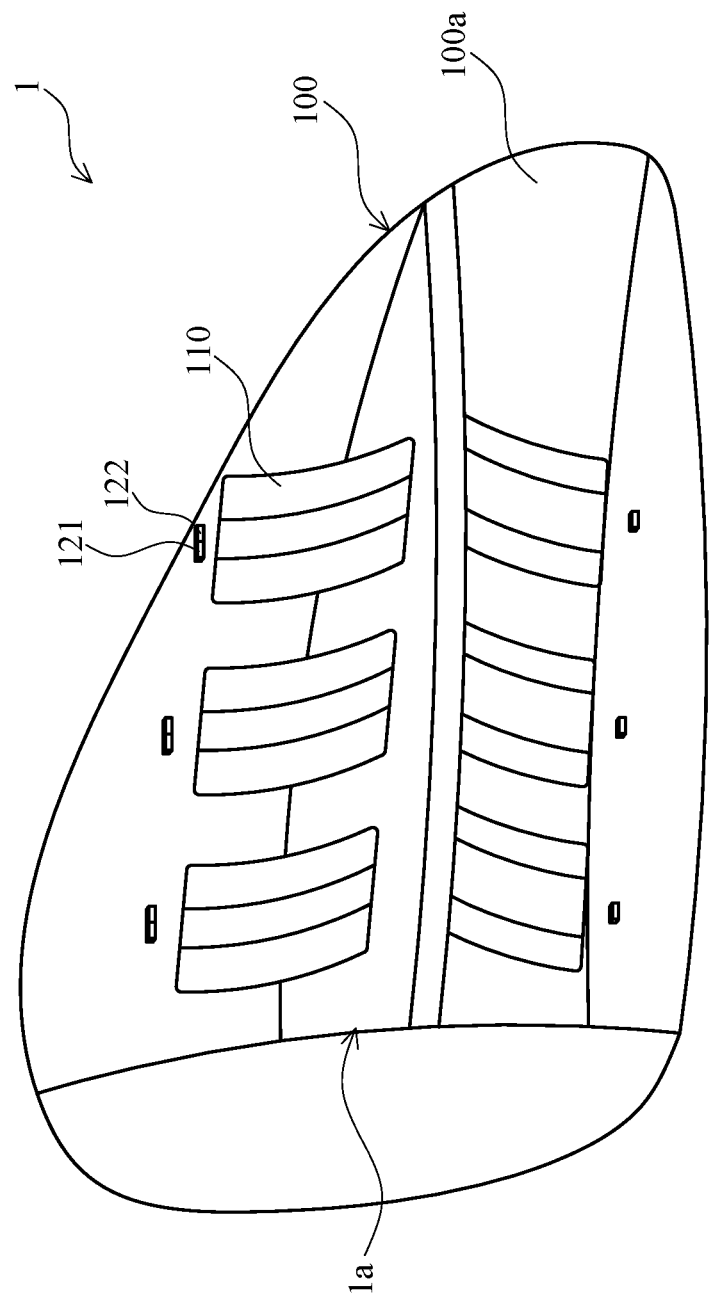
FIG. 1 is a schematic structural diagram of a vehicle lamp with an illumination module according to an embodiment of this disclosure.

FIG. 1 is a schematic structural diagram of a vehicle lamp with an illumination module according to an embodiment of this disclosure. The vehicle lamp 1 comprises a plurality of illumination modules 100 with multi light sources, wherein illumination modules 100 are integrated into a lamp housing 1a. In one specific embodiment, the vehicle lamp 1 may be a headlight for vehicle. In practical application, an ordinary headlamp can be directly replaced by the vehicle lamp 1 described in this disclosure, so as to improve the lighting effect and safety of the vehicle.

In one specific embodiment, the vehicle lamp 1 may further includes an auxiliary illumination module 100a integrated in the lamp housing 1a. In one embodiment of this disclosure, the illumination module 100 may be a low beam module, and the auxiliary illumination module 100a may be a high beam module. In another embodiment of this disclosure, the illumination module 100 may be the high beam module, and the auxiliary illumination module 100a may be the low beam module.

Figure 2:
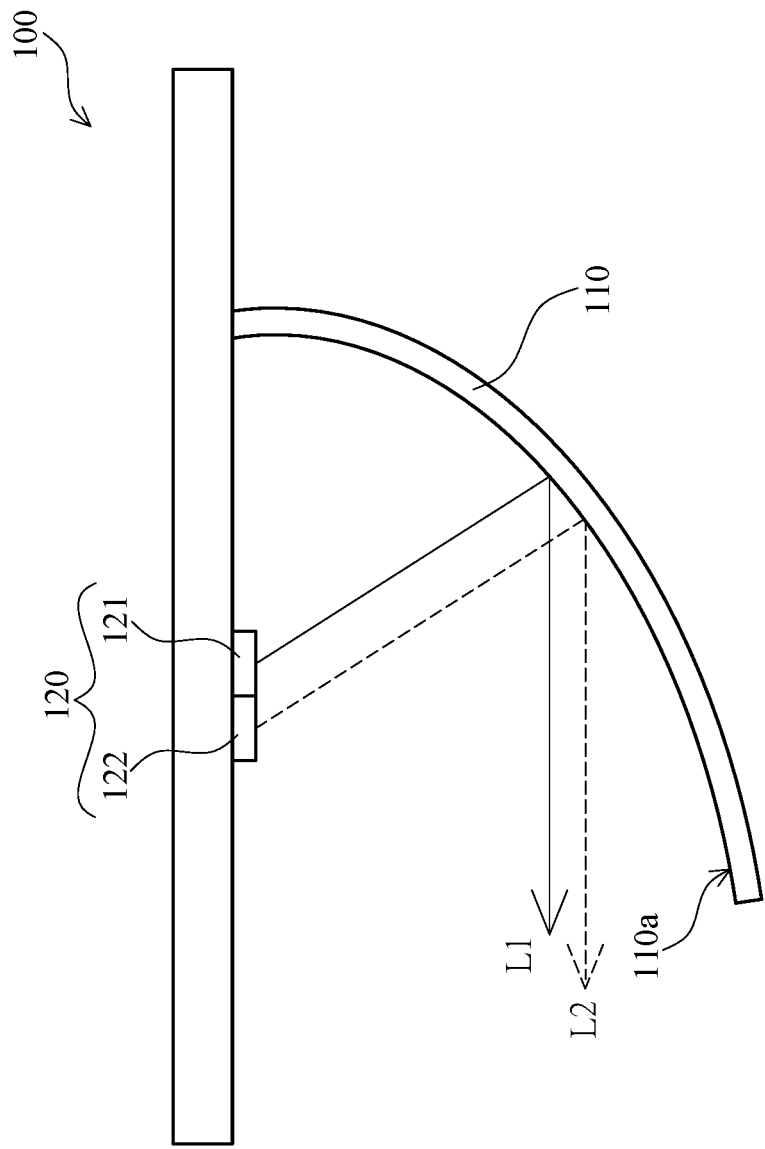
FIG. 2 is a cross view of the illumination module with multi light sources according to an embodiment of this disclosure.

As shown in FIG. 1 and FIG. 2, the illumination module 100 with multi light sources includes at least one light path adjustment unit 110, at least one first light source 121, and at least one second light source 122.

As shown in FIG. 1 and FIG. 2, the first light source 121 and the second light source 122 are respectively configured to generate a first color light L1 and a second color light L2. The first color light L1 and the second color light L2 are light with different wavelengths, colors or color temperatures. For example, the first color light L1 is white light, and the second color light L2 is yellow light. In one specific embodiment, the first light source 121 and the second light source 122 may be light emitting diodes (LEDs). The first light source 121 and the second light source 122 are light emitting diodes are only one embodiment of this disclosure, but other type of light sources is not excluded in this disclosure.

As shown in FIG. 1 and FIG. 2, the first light source 121 is configured to project the first color light L1 to the light path adjustment unit 110, and the second light source 122 is configured to project the second color light L2 to the light path adjustment unit 110. The light path adjustment unit 110 projects the first color light L1 and the second color light L2 to the front of the illumination module 100 with multi light sources, and the first color light L1 and the second color light L2 partially or fully overlap. For example, the light path adjustment unit 110 may be configured to reflect and/or refract the first color light L1 and the second color light L2.

As shown in FIG. 1 and FIG. 2, the light path adjustment unit 110 is a reflecting cup and includes a concave reflecting surface 110a. The first color light L1 and the second color light L2 are projected to the concave reflecting surface 110a, and projection points or projection regions of the first color light L1 and the second color light L2 on the concave reflecting surface 110a are different. As shown in FIG. 2, the concave reflecting surface 110a has different curvature radius, angles of reflection or angles of incidence on the projection points.

Figure 3:
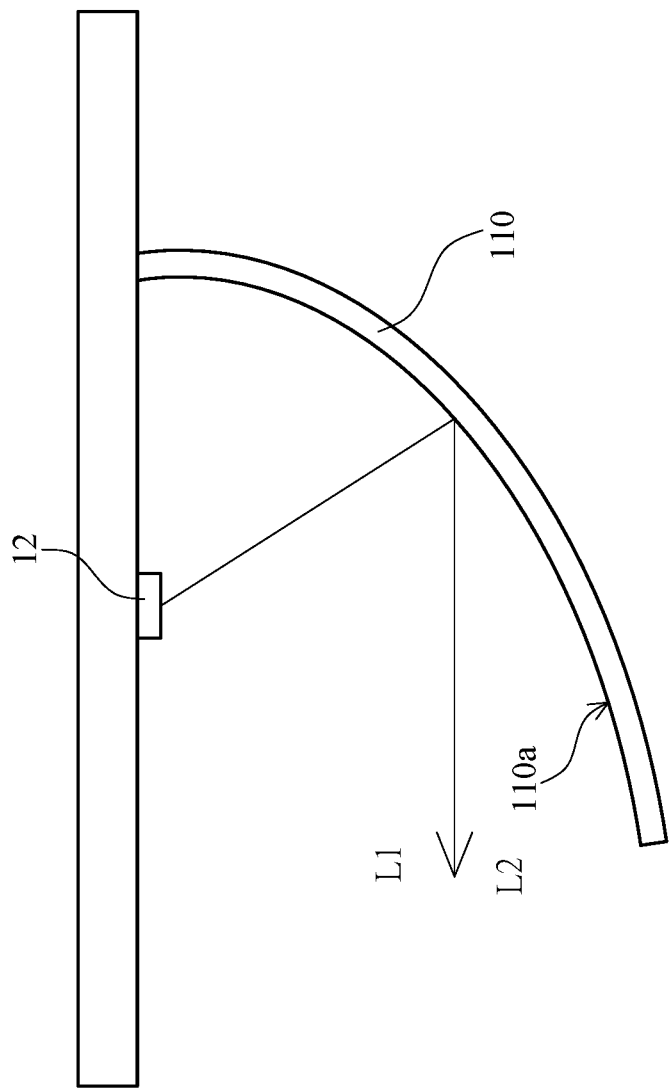
FIG. 3 is a cross view of the illumination module with multi light sources according to another embodiment of this disclosure.

As shown in FIG. 3, the first light source 121 and the second light source 122 may be integrated into a single variable color light module 12, and projection ranges of the first color light L1 and the second color light L2 overlap. For example, the variable color light module 12 may include two LED dies, and the two LED dies are packaged to form a LED device and can be used to generate color light of diverse colors.

The reflecting cup described in this disclosure may be a spherical reflector or an aspheric reflector, such as a parabolic reflector.

In one embodiment, the first light source 121 is adjacent to the second light source 122. For example, the first light source 121 and the second light source 122 are arranged close to each other, and both the two light sources are close to a focal point, a principal axis or an optical axis of the reflecting cup. The first light source 121 and the second light source 122 may simultaneously project the first color light L1 and the second color light L2 to the reflecting cup (light path adjustment unit 110), and the reflecting cup reflects the first color light L1 and the second color light L2 to the front of the illumination module 100 with multi light sources, such that the first color light L1 and the second color light L2 partially overlap to form a lighting for bad weather.

In one embodiment of this disclosure, the projection height/angle of the second color light L2 is set to be lower than the projection height/angle of the first color light L1, so as to avoid the second color light L2 (in particular when it is yellow light) from impacting the opposite direction of the vehicle, but can produce sufficient lighting on the ground near.

Figure 4:
FIG. 4 is a schematic structural diagram of a light source array of the illumination module with multi light sources according to an embodiment of this disclosure.

The first light source 121 and the second light source 122 of the illumination module 100 with multi light sources as shown in FIG. 1, FIG. 2 and FIG. 4 are adjacent to each other. For example, plural first light sources 121 and plural second light sources 122 are closely arranged into a light source array 120.

As shown in FIG. 4, the light source array 120 may include nine LEDs, such as three first light sources 121 and six second light sources 122, wherein two sides of each of the three first light sources 121 are provided one second light source 122.

The light source array 120 in FIG. 4 is only an example. In practical, the number and position of the first light sources 121 and the second light sources 122 of the light source array 120 may be adjusted according to the beam pattern and illumination requirements, so that the illumination module 100 with multiple light sources produces the first color light L1 and the second color light L2 for bad weather to comply with the relevant laws and regulations.

Figure 5:
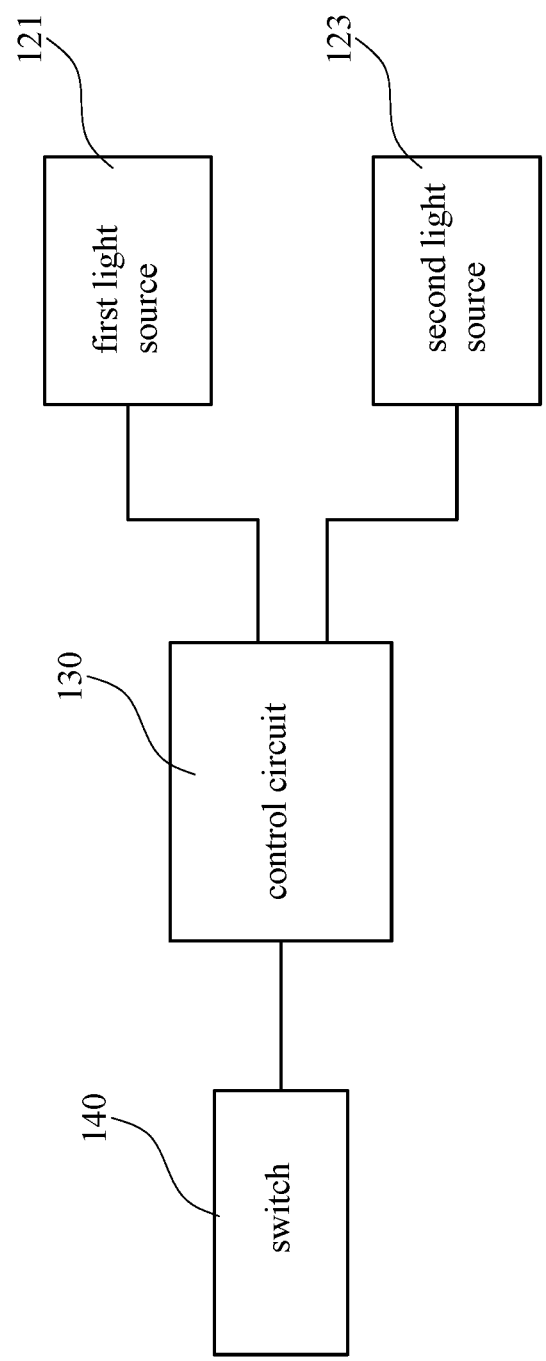
FIG. 5 is a schematic structural diagram of light sources, a control circuit and a switch of the illumination module with multi light sources according to an embodiment of this disclosure.

As shown in FIG. 5, the illumination module 100 with multi light sources further includes a control circuit 130 and a switch 140. The control circuit 130 is configured to control turn-on/turn-off of the first light source 121 and the second light source 122. For example, the control circuit 130 may be a multistage toggle switch. The switch 140 may be a high beam switch or an overtaking light switch of the vehicle. The switch 140 is configured to transmit a trigger signal to the control circuit 130, and the control circuit 130 turns on or turns off the first light source 121 and the second light source 122 according to the trigger signal.

When the first light source 121 is turned on, the control circuit 130 turns on or off the second light source 122 by accepting the trigger signal for a specific number of times as a cycle of triggering. For example, the switch 140 turns on the second light source 122 every three times it is triggered, and then turns off the second light source 122 when it is triggered again, until switch 140 is triggered another three times and turns on the second light source 122 again.

Specifically, the illumination module 100 with multi light sources of this disclosure may have three operation modes. The first operation mode is the first light source 121 and the second light source 122 are not emitting light, which is usually applied in the daytime or a well-lit driving environment.

The second operation mode is that the first light source 121 and the second light source 122 of the illumination module 100 emit light simultaneously. The first light source 121 is turned on at first to emit the first color light L1, while the second light source 122 is turned off and emits no light. The control circuit 130 receives the trigger signal for the specific number of times when the first light source 121 is turned on, and turns on the second light source 122 to emit the second color light L2 according to the cycle of triggering, and the first light source 121 remains to emit the first color light L1, so that the illumination module 100 with light sources emits the first color light L1 and the second color light L2 simultaneously. The second operation mode is usually used in the night or under-illuminated vehicle environment.

Figure 6:
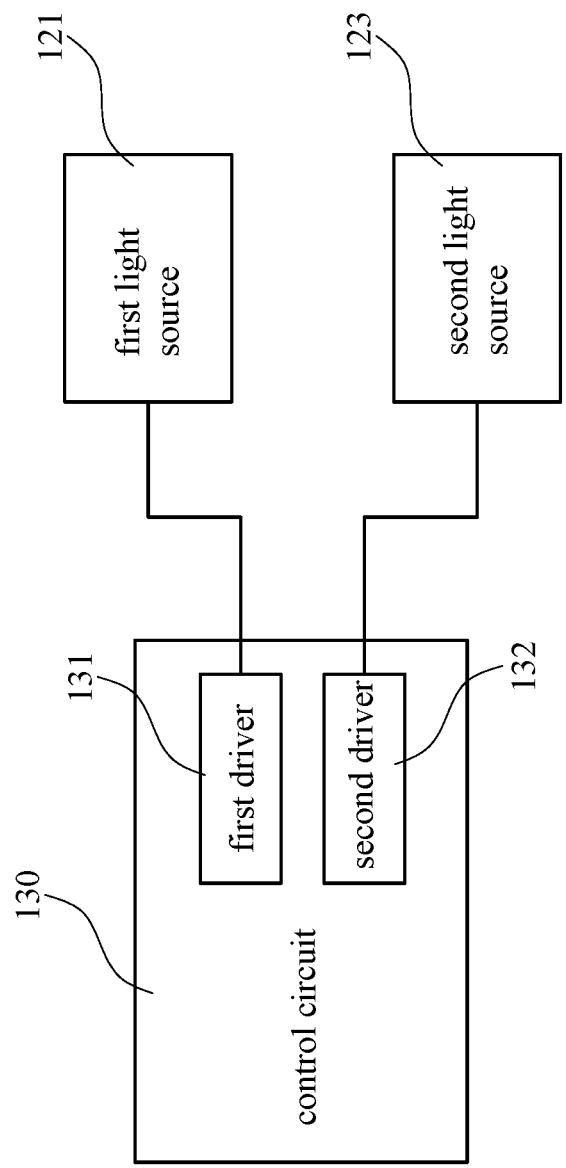
FIG. 6 is a schematic structural diagram of light sources and the control circuit of the illumination module with multi light sources according to another embodiment of this disclosure.

As shown in FIG. 6, in this case, the first light source 121 and the second light source 122 may need be turned on simultaneously, such as in the second operation mode. Therefore, the control circuit 130 may further include a first driver 131 and a second driver 132. The first driver 131 is configured to provide power to the first light source 121, and the second driver 132 is configured to provide power to the second light source 122. The two drivers provide sufficient total electrical power to the first light source 121 and the second light source 122, so as to avoid insufficient luminosity of the first color light L1 and the second color light L2 due to the low current output by one single driver.

The first driver 131 and the second driver 132 integrated into the control circuit 130 shown in FIG. 6 is only one embodiment of this disclosure and is not intended to limit the scope of the patent application of the present invention. In other embodiments, the first driver 131 and the second driver 132 may be located outside the control circuit 130 and be connected to the control circuit 130. For example, the first driver 131 is located between the control circuit 130 and the first light source 121, and the second driver 132 is located between the control circuit 130 and the second light source 122.

The third operation mode is that only one of the first light source 121 and the second light source 122 of the illumination module 100 with multiple light sources is turned on. In this case, if the first light source 121 is turned off, the control circuit 130 receives the trigger signal for the specific number of times, and turns on the second light source 122 to emit the second color light L2 according to the cycle of triggering and turns off the first light source 122. If the first light source 121 is turned on and the low beam group is turned on, the control circuit 130 receives the trigger signal for the specific number of times, turns on the second light source 122 according to the cycle of triggering, and turns off the first light source 121.

Figure 7:
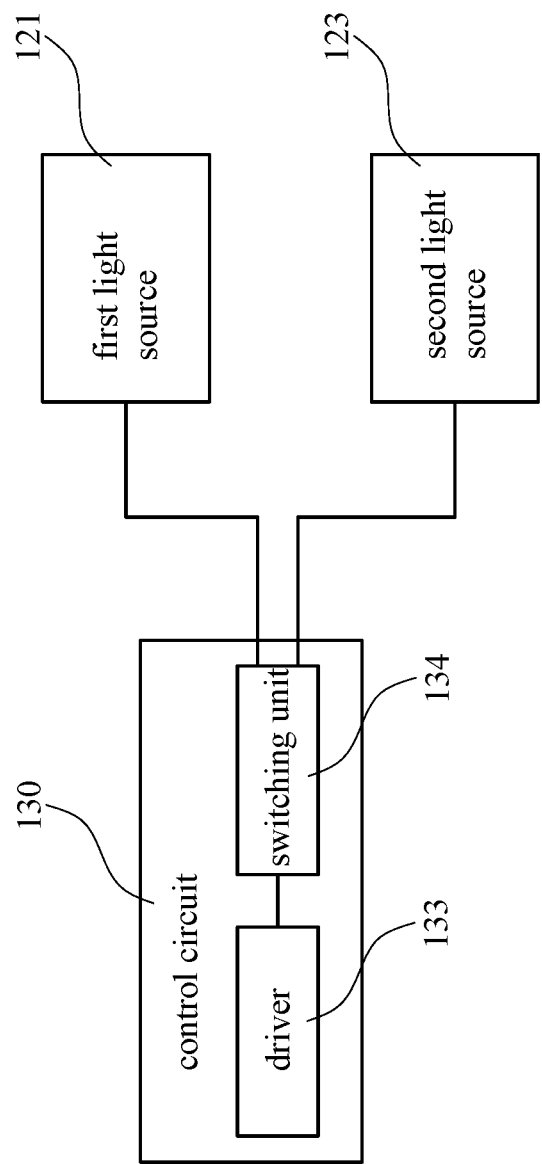
FIG. 7 is a schematic structural diagram of light sources and the control circuit of the illumination module with multi light sources according to another embodiment of this disclosure.

As shown in FIG. 7, in this case, the first light source 121 and the second light source 122 will not be turned on at the same time. Thus, the control circuit 130 only includes a driver 133 and a switching unit 134, wherein the driver 133 is configured to provide power to the switching unit 134, and then the switching unit 134 provides power to the first light source 121 or the second light source 122 depending on demand.

The driver 133 integrated into the control circuit 130 shown in FIG. 7 is only one embodiment of this disclosure and is not intended to limit the scope of the patent application of the present invention. In other embodiments, the driver 133 may be located outside the control circuit, and be connected to the control circuit 130.

Figure 8:
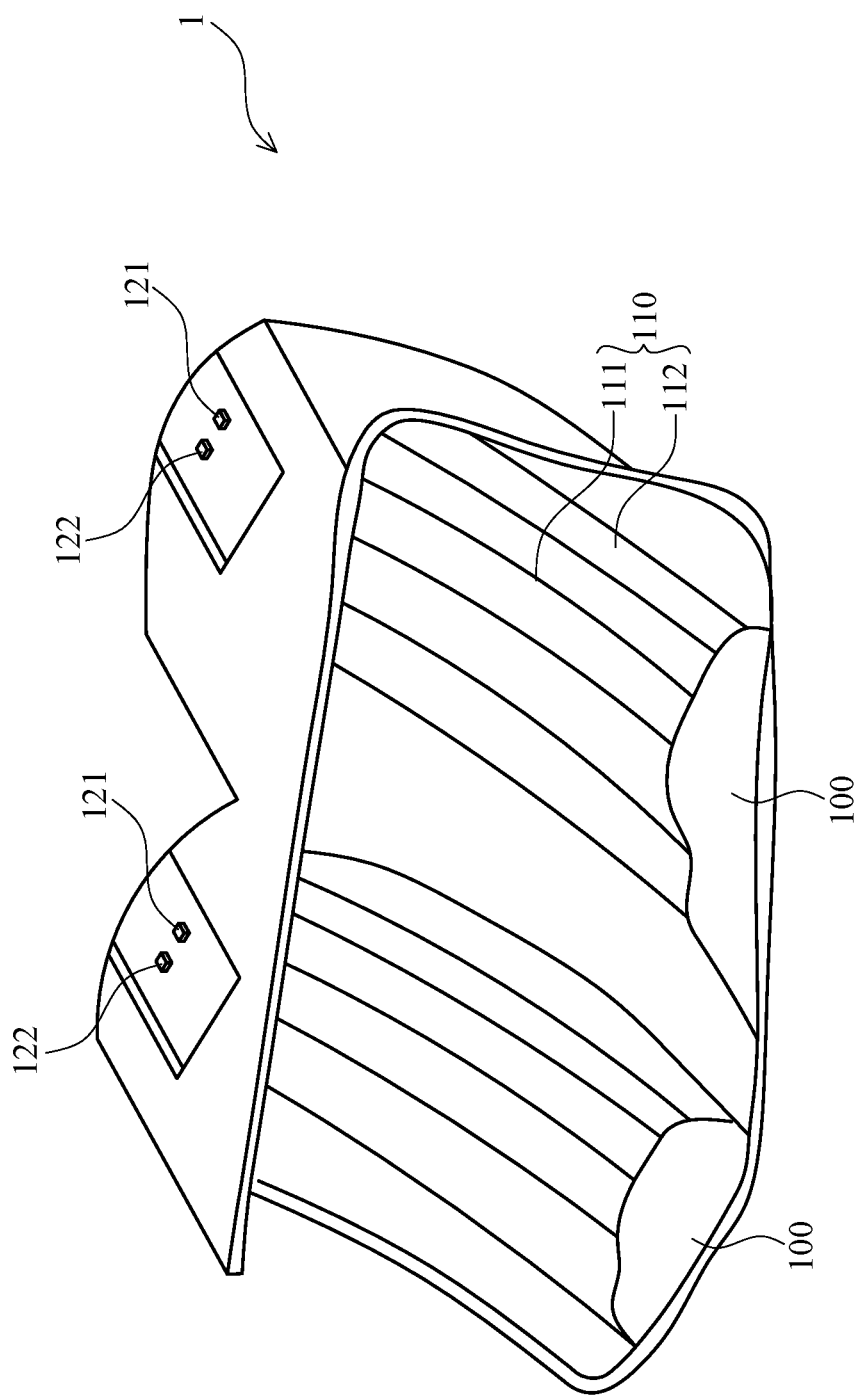
FIG. 8 is a schematic three-dimensional diagram of the illumination module with multi light sources according to another embodiment of this disclosure.
Figure 9:
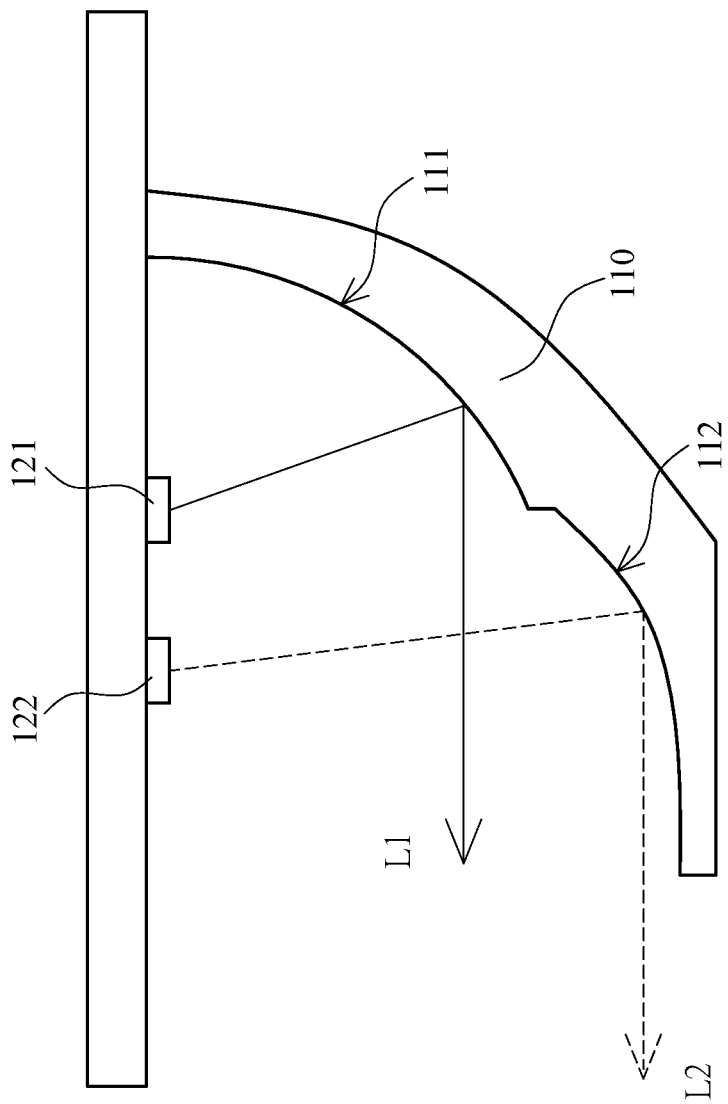
FIG. 9 is a schematic three-dimensional diagram of the illumination module with multi light sources according to another embodiment of this disclosure.

As shown in FIG. 8 and FIG. 9, there is a distance between the first light source 121 and the second light source 122, and the reflecting cup includes a first reflecting member 111 and a second reflecting member 112. The first reflecting member 111 and the second reflecting member 112 may be different types of reflecting surfaces, that is, the first reflecting member 111 and the second reflecting member 112 have different curvature radius, angles of reflection or angles of incidence for the first color light L1 and the second color light L2. The first reflecting member 111 is configured to reflect the first color light L1 generated by the first light source 121, and the second reflecting member 112 is configured to reflect the second color light L2 generated by the second light source 122.

In one embodiment, the illumination module 100 may include a projection lens located downstream of the light path of the reflecting cup, wherein the first color light L1 and/or the second color light L2 reflected by the light path adjustment unit 110 will pass through the projection lens and be projected to the front of the illumination module 100.

In practical application, the ordinary headlamp can be directly replaced by the illumination module 100 described in this disclosure, and the light control lever in the vehicle can be adjusted, so that the vehicle is able to emit a lighting for bad weather. In other words, the vehicle lamp described in thus disclosure can be quickly and conveniently installed on the general vehicle, so as to improve the safety of the vehicle.

The above description is only a preferred embodiment of this disclosure and is not intended to limit the scope of this disclosure. Modifications should be included within the scope of the patent application of this disclosure.

What is claimed is:

1. An illumination module with multi light sources, comprising:
   at least one light path adjustment unit;
   at least one first light source configured to generate a first color light, and projecting the first color light to the light path adjustment unit; and
   at least one second light source configured to generate a second color light, and projecting the second color light to the light path adjustment unit, wherein the light path adjustment unit is configured to project the first color light and the second color light to a front of the illumination module with multi light sources, such that the first color light and the second color light partially or fully overlap; and
   a control circuit being configured to turn-on or turn-off the first light source and the second light source, and a switch being configured to transmit trigger signals to the control circuit, wherein the switch is a vehicle light switch of a vehicle to be toggled to transmit the trigger signals or turned to turn on or off the first light source;
   wherein when the first light source is turned on, the control circuit turns on or off the second light source by accepting the trigger signal for a specific number of times as a cycle of triggering, and the specific number is two or more than two.

2. The illumination module with multi light sources as claimed in claim 1, wherein the light path adjustment unit is a reflecting cup, and includes a concave reflective surface.

3. The illumination module with multi light sources as claimed in claim 2, wherein projection points of the first color light and the second color light on the concave reflective surface are different, and the concave reflective surface has different curvature radius on the projection points.

4. The illumination module with multi light sources as claimed in claim 2, wherein the first light source is adjacent to the second light source, and both the two light sources are close to a focal point, a principal axis or an optical axis of the reflecting cup.

5. The illumination module with multi light sources as claimed in claim 2, wherein a distance exists between the first light source and the second light source, the reflecting cup includes a first reflecting member and a second reflecting member, the first reflecting member is configured to reflect the first color light generated by the first light source, and the second reflecting member is configured to reflect the second color light generated by the second light source.

6. The illumination module with multi light sources as claimed in claim 5, wherein the first reflecting member and the second reflecting member are different types of reflecting surfaces, and have different curvature radius, angles of reflection or angles of incidence.

7. The illumination module with multi light sources as claimed in claim 1, wherein the first color light is a white light, and the second color light is a yellow light.

8. The illumination module with multi light sources as claimed in claim 1, wherein the control circuit receives the trigger signal for the specific number of times when the first light source is turned on, and turns on the second light source to emit the second color light according to the cycle of triggering, and the first light source remains to emit the first color light.

9. The illumination module with multi light sources as claimed in claim 1, wherein the control circuit further includes a first driver and a second driver, the first driver is configured to provide power to the first light source, and the second driver is configured to provide power to the second light source.

10. The illumination module with multi light sources as claimed in claim 1, wherein the control circuit receives the trigger signal for the specific number of times when the first light source is turned off, and turns on the second light source to emit the second color light according to the cycle of triggering; or the control circuit receives the trigger signal for the specific number of times when the first light source is turned on, and turns on the second light source to emit the second color light according to the cycle of triggering and turns off the first light source.

11. The illumination module with multi light sources as claimed in claim 1, wherein the first light source and the second light source are LEDs.

12. A vehicle lamp, comprising:
   a plurality of illumination modules as claimed in claim 1, integrated into a lamp housing.

13. The vehicle lamp as claimed in claim 12, further including at least one auxiliary illumination module integrated into the lamp housing.

\* \* \* \* \*